United States Patent
Hillen (10) Patent No.: US 10,895,880 B2
(45) Date of Patent: Jan. 19, 2021

(54) METHOD FOR OPERATING A SELF-TRAVELING VEHICLE

(71) Applicant: Vorwerk & Co. Interholding GmbH, Wuppertal (DE)

(72) Inventor: Lorenz Hillen, Wuppertal (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 287 days.

(21) Appl. No.: 15/954,986

(22) Filed: Apr. 17, 2018

(65) Prior Publication Data

US 2018/0299902 A1 Oct. 18, 2018

(30) Foreign Application Priority Data

Apr. 18, 2017 (DE) ........................ 10 2017 108 194

(51) Int. Cl.
*G05D 1/02* (2020.01)
*G06K 9/00* (2006.01)
(Continued)

(52) U.S. Cl.
CPC .......... *G05D 1/0246* (2013.01); *A47L 9/2805* (2013.01); *A47L 9/2857* (2013.01); *A47L 11/4008* (2013.01); *B60K 35/00* (2013.01); *G05D 1/0094* (2013.01); *G06F 1/1686* (2013.01); *G06F 3/005* (2013.01);
(Continued)

(58) Field of Classification Search
CPC .. G05D 1/0246; G05D 1/0094; G06F 3/0304; G06F 3/01; G06F 3/011; G06F 1/1686; G06F 3/005; G06F 3/015; G06F 2200/1614; G06K 9/00375; G06K 9/00288; G06K 9/00805; A47L 9/2805; A47L 9/2857; A47L 11/4008; A47L 2201/00; A47L 11/4061; A47L 11/4011; A47L 11/24;
(Continued)

(56) References Cited

U.S. PATENT DOCUMENTS 6,243,076 B1 * 6/2001 Hatfield .................. G06F 3/013
345/156
9,298,183 B2 3/2016 Artes et al.
(Continued)

FOREIGN PATENT DOCUMENTS

DE 10 2008 014 912 A1 9/2009
DE 10 2011 000 250 A1 7/2012
DE 10 2012 109 004 A1 3/2014

*Primary Examiner* — Jeff A Burke
*Assistant Examiner* — Kyle T Johnson
(74) *Attorney, Agent, or Firm* — Collard & Roe, P.C.

(57) ABSTRACT

The invention pertains to a method for operating an unmanned vehicle (1) that travels by itself within an environment, particularly a cleaning robot, wherein the vehicle (1) detects obstacles and/or persons located within the environment, and wherein information (3) is displayed for a user (2) on a screen (4) of the vehicle (1), which with respect to a displaying plane is usually aligned horizontally during the operation of the vehicle (1). In order to enable a user (2) of the vehicle (1) to always optimally read the information (3) regardless of his position, it is proposed that, when the presence of a user (2) is detected, a spatial position of the user (2) relative to the vehicle (1) is determined and an orientation of the displayed information (3) is varied in dependence on the determined spatial position of the user (2).

9 Claims, 6 Drawing Sheets

(51) Int. Cl.
*G05D 1/00* (2006.01)
*B60K 35/00* (2006.01)
*G06F 3/01* (2006.01)
*G06F 3/00* (2006.01)
*A47L 11/40* (2006.01)
*G06F 1/16* (2006.01)
*A47L 9/28* (2006.01)
*G06F 3/03* (2006.01)

(52) U.S. Cl.
CPC ............... *G06F 3/01* (2013.01); *G06F 3/011* (2013.01); *G06F 3/015* (2013.01); *G06F 3/0304* (2013.01); *G06K 9/00288* (2013.01); *G06K 9/00375* (2013.01); *G06K 9/00805* (2013.01); *A47L 2201/00* (2013.01); *B60K 2370/152* (2019.05); *B60K 2370/73* (2019.05); *G06F 2200/1614* (2013.01)

(58) Field of Classification Search
CPC .............. B60K 35/00; B60K 2370/152; B60K 2370/73
See application file for complete search history.

(56) References Cited

U.S. PATENT DOCUMENTS

| | | | | |
|---|---|---|---|---|
| 9,659,403 | B1* | 5/2017 | Horowitz | G06T 7/70 |
| 10,317,992 | B2* | 6/2019 | Prokofieva | G02B 27/0093 |
| 2004/0174496 | A1* | 9/2004 | Ji | G06F 3/013 |
| | | | | 351/209 |
| 2005/0104848 | A1* | 5/2005 | Yamaguchi | G06F 1/1626 |
| | | | | 345/156 |
| 2007/0019000 | A1* | 1/2007 | Motomura | H04N 5/23293 |
| | | | | 345/619 |
| 2009/0200378 | A1* | 8/2009 | Doherty | A61B 5/0077 |
| | | | | 235/462.01 |
| 2010/0256812 | A1* | 10/2010 | Tsusaka | A47L 9/24 |
| | | | | 700/254 |
| 2011/0125324 | A1* | 5/2011 | Baek | G05D 1/0219 |
| | | | | 700/258 |
| 2011/0202300 | A1* | 8/2011 | Udagawa | G01B 21/045 |
| | | | | 702/95 |
| 2011/0303748 | A1* | 12/2011 | Lemma | G06K 7/1417 |
| | | | | 235/454 |
| 2013/0038437 | A1* | 2/2013 | Talati | B60K 37/06 |
| | | | | 340/438 |
| 2014/0156076 | A1* | 6/2014 | Jeong | B25J 9/0003 |
| | | | | 700/257 |
| 2014/0240464 | A1* | 8/2014 | Lee | G01B 11/2513 |
| | | | | 348/47 |
| 2014/0282282 | A1* | 9/2014 | Holz | G06F 3/017 |
| | | | | 715/863 |
| 2015/0130704 | A1* | 5/2015 | Seichter | G06F 3/012 |
| | | | | 345/156 |
| 2015/0265125 | A1* | 9/2015 | Lee | A47L 11/4061 |
| | | | | 701/26 |
| 2015/0355805 | A1* | 12/2015 | Chandler | G06F 3/04842 |
| | | | | 715/784 |
| 2016/0210503 | A1* | 7/2016 | Yin | G06K 9/00335 |
| 2016/0374526 | A1* | 12/2016 | Yang | A47L 11/4011 |
| | | | | 701/23 |
| 2017/0010677 | A1* | 1/2017 | Roh | G06F 3/0488 |
| 2017/0231446 | A1* | 8/2017 | Watanabe | A47L 9/00 |
| | | | | 15/319 |
| 2018/0299902 | A1* | 10/2018 | Hillen | A47L 11/4008 |
| 2019/0294954 | A1* | 9/2019 | Han | G05D 1/0088 |

* cited by examiner

METHOD FOR OPERATING A SELF-TRAVELING VEHICLE

CROSS REFERENCE TO RELATED APPLICATIONS

Applicant claims priority under 35 U.S.C. § 119 of German Application No. 10 2017 108 194.1 filed on Apr. 18, 2017, the disclosure of which is incorporated by reference.

TECHNICAL FIELD

The invention pertains to a method for operating an unmanned vehicle that travels by itself within an environment, particularly a cleaning robot, wherein the vehicle detects obstacles and/or persons located within the environment, and wherein information is displayed for a user on a screen of the vehicle, which with respect to a displaying plane is usually aligned horizontally during the operation of the vehicle.

The invention furthermore pertains to an unmanned vehicle that travels by itself within an environment, particularly a cleaning robot, with an image acquisition device for detecting obstacles and/or persons located within the environment, wherein the vehicle features a screen for displaying information, which with respect to a displaying plane is usually aligned horizontally during the operation of the vehicle.

PRIOR ART

Self-traveling vehicles are known from the prior art. For example, publication DE 10 2012 109 004 A1 discloses a vehicle that is realized in the form of a cleaning robot. This publication describes a cleaning robot with a man-machine interface that may feature a screen on a housing of the cleaning robot. Information on a treatment process of the cleaning robot, among other things also information concerning a cleaning environment, can be displayed on this screen.

It is furthermore known to equip self-traveling vehicles such as cleaning robots with a detection device that can detect obstacles within the environment of the cleaning robot, e.g. from publications DE 10 2008 014 912 A1 and DE 10 2011 000 250 A1. While the vehicle travels over a section of the environment such as a room of a residence, the detection device measures distances from obstacles, which serve as the basis for generating an environment map. Depending on a measured distance from an obstacle, the vehicle can react with appropriate routing and evasive maneuvers in order to prevent a collision with the obstacle.

Different types of detection devices for cleaning robots such as ultrasonic sensors, contact sensors, cameras systems and the like are furthermore known from the prior art.

In the prior art, information concerning the operation of the vehicle, characteristics of the environment or even options for the operation of the vehicle is displayed on the screen of the vehicle with a fixed displaying direction. The displaying direction is usually oriented in such a way that a user can optimally read the information, particularly text information, when the user is located in front of the vehicle referred to a main traveling direction of the vehicle.

However, the described displaying direction is uncomfortable for the user of the vehicle, e.g., if the vehicle should be operated from a vehicle side or from the rear.

SUMMARY OF THE INVENTION

The invention is therefore based on the objective of respectively developing a method for operating a self-traveling vehicle and such a self-traveling vehicle, in which the operability of the vehicle is optimized, particularly also with respect to an operation from different sides of the vehicle.

In order to attain the above-defined objective, it is initially proposed that, when the presence of a user is detected, a spatial position of the user relative to the vehicle is determined and an orientation of the displayed information is varied in dependence on the determined spatial position of the user.

Due to the invention, the information can now be displayed for a user on the screen of the vehicle in such a way that the user can always conveniently read this information from his current position and orientation without having to move and/or turn relative to the vehicle or the display. For this purpose, a detection device of the vehicle or a detection device arranged externally of the vehicle detects a position of the user relative to the vehicle. If it is determined that the information currently displayed on the screen is not made available in a displaying direction, which typically enables the user to read the information from above (referred to the displaying plane), the displaying direction is changed in such a way that the user can optimally read the information from his current spatial position in a corresponding viewing direction of the vehicle and/or the screen without having to change his position and orientation. The presence of a person in the vicinity of the vehicle may suffice as the triggering event for causing a change of the displaying direction or for at least checking whether a current displaying direction is suitable. In this case, it may not be necessary that the user faces the vehicle or even looks at the vehicle. According to this embodiment, the display of the information on the screen is already adapted as a precaution, particularly in case the person present intends to operate the vehicle or read information on the screen in the near future.

It is proposed that the presence of a user is detected by means of an image acquisition device. The image acquisition device preferably consists of a camera or at least a camera chip, the image data of which is analyzed in order to determine if a person is located within the detection range. Conventional image processing methods make it possible to decide whether an object is an item or a human figure based on defined characteristics. If it is determined that a person is present within a defined environment of the vehicle, it can be determined in another step whether the displaying direction of the information on the screen is suitable for enabling the user to optimally and conveniently read the information displayed on the screen from his current spatial position relative to the vehicle. If this is not the case, the orientation of the displayed information is adapted to the determined spatial position of the user in the proposed fashion.

It is particularly proposed that a viewing direction of the user is determined by means of a face recognition process. According to this embodiment, not only the presence or position of a user relative to the vehicle is determined, but specifically also the direction, in which the user is currently looking. It can particularly be analyzed if the user is looking at the vehicle. If the user is not looking in the direction of the vehicle, but rather in a different direction in space, the displaying direction on the screen of the vehicle may not be adapted. However, the orientation of the displayed information is adapted if it is determined that the user is looking in the direction of the vehicle, particularly at the screen of the vehicle, and/or that the user faces the image acquisition device. In this case, the face recognition process may also include an identity check of the user, i.e. a check to the effect whether the user is a registered user of the vehicle, who is also authorized to operate the vehicle. Analogous to the above-described mere determination of the spatial position of the user relative to the vehicle, the face recognition process also makes it possible to detect whether the user is currently located in front of, adjacent to or behind the vehicle or its screen, respectively.

It is furthermore proposed to detect an operating direction, from which the user operates the vehicle. In this embodiment, it is determined from which direction the user operates, e.g., an input interface of the vehicle, particularly a touchscreen. In order to detect the operating direction, the user has to approach the input interface and/or the screen of the vehicle, e.g. with one hand, in order to operate the vehicle in the near future or in the moment of detection. The operating direction may alternatively be detected by means of an image acquisition device. It would likewise be conceivable to utilize contact sensors, touch-sensitive screens or the like.

It is particularly proposed to detect the orientation of a hand of the user that manipulates the vehicle. The operating direction, from which the user operates or would like to operate the vehicle, and therefore also the current spatial position and orientation of the user in the environment can be determined based on the orientation of the user's hand. For example, the image acquisition device of the user records an image of the user's hand that manipulates the vehicle or is it least located in the vicinity of the vehicle. Subsequently, the recorded image is analyzed with the aid of an image processing method in order to determine the direction, in which the hand is oriented toward the vehicle.

It is particularly proposed that the orientation of the hand is detected by means of a capacitive sensor, particularly a capacitive screen. When a hand of the user moves toward a capacitive sensor, the capacitance changes and the presence of the hand can be detected. The capacitive sensor may be advantageously integrated into the screen of the vehicle, namely in the form of a capacitive touchscreen. It is therefore possible to detect the operating direction, from which the user currently operates the vehicle, based on the signal measured by the screen. For example, the sections of the sensor or the screen, the capacity of which is increased, point in a direction that can be assumed to be the operating direction. The operating direction or the orientation of the user's hand may alternatively and/or additionally also be detected by means of an image acquisition device, e.g. a camera.

It is furthermore proposed to select one of multiple potential displaying directions of the screen in dependence on the determined spatial position of the user. For example, multiple preferred displaying directions may be defined for the information displayed on the screen. On a rectangular screen, for example, this may be the displaying directions that are oriented parallel to the sides, namely four displaying directions that are rotated relative to one another by 90°. In case discrete displaying directions are defined for displaying the information on the screen, it is proposed to initially determine the viewing direction or operating direction of the user and to subsequently check which displaying direction lies closest to the current viewing direction or operating direction. If neither of the predefined displaying directions of the screen is oriented parallel to a viewing direction or operating direction of the user, it is preferred to select the displaying direction with the smallest angular deviation from the viewing direction or operating direction. However, it would also be conceivable that the displaying directions are selected in an infinitely variable fashion, i.e. that no discrete displaying directions are defined, e.g., by the screen. This is the case, for example, if the screen is round such that the information can be displayed in any direction, e.g., without a corner region of the information section being cut off by the outer contour of the screen. In order to prevent the information from being cut off by the contour of the screen when the information displayed on the screen is rotated, it would also be conceivable to realize the display area of the screen to be oriented larger than the area required for displaying the information. In this way, the screen content can be aligned in all desired directions in such a way that the size of the displayed information remains constant.

It is furthermore proposed that multiple sections of the information displayed on the screen and/or operating elements displayed on the screen are regrouped relative to one another in dependence on the spatial position of the user. According to this embodiment, for example, at least one operating element is displayed on the screen, wherein an orientation and/or a position of the operating element relative to the displayed information and/or other operating elements is varied in dependence on the determined spatial position of the user. The operating element particularly can be displayed on an edge of the display area of the screen that faces the user, preferably between the edge of the display area facing the user and the displayed information. In this way, information and/or operating elements displayed on the screen can be at least partially regrouped in dependence on the spatial position of the user such that its/their position on the display area is changed and, for example, a section of the information, which was previously arranged above another section in the viewing direction of the user, is now arranged adjacent to this section. The operating elements are displayed on the screen, for example, in the form of touch-sensitive areas, on which the user can press, for example, in order to make a menu selection. The operating elements can preferably be arranged in an edge region of the display area of the screen, particularly in front of the displayed text information referred to the viewing direction of the user, such that the user does not cover the additional information displayed on the screen with his hand during the actuation of one of the operating elements. Consequently, the information can preferably be arranged on the screen in such a way that the operating elements always point in the direction of the user and therefore are located between the remaining information being displayed, for example textual components, and the user. It would furthermore be conceivable to assign separate actuating elements in the form of buttons to the screen outside the display area. In this case, the operating elements displayed on the screen may contain explanations and/or designations for the associated actuating elements such that the user is provided with information on the function of the actuating elements. In order to ensure, for example, that the operating elements always remain adjacent to the associated actuating elements even if the orientation of the information on the screen changes, the operating elements can be always displayed on the edge of the display area, which lies adjacent to the actuating elements.

According to a particularly preferred embodiment, it is proposed to implement the method by successively carrying out the following steps:
  recording the environment of the vehicle by means of an image acquisition device,
  detecting the presence of a user in the environment of the vehicle,
  determining a viewing direction and/or an operating direction of a hand of the user,
  associating the certain viewing direction and/or operating direction with a displaying direction of the screen, and displaying information with the orientation of the associated displaying direction.

The above-described steps may be carried out repeatedly in order to optimally align the screen content. For example, a camera image of the environment of the vehicle is initially recorded and a face recognition process for recognizing a face of a user and for determining a viewing direction of the user is then carried out, wherein a potential displaying direction on the screen, which corresponds best to the determined viewing direction, is subsequently selected. The information displayed on the screen is then accordingly rotated into the optimal displaying direction such that the user can optimally read the information from his viewing direction.

In addition to the above-described method, the invention furthermore proposes an unmanned vehicle that travels by itself within an environment, particularly a cleaning robot, wherein the vehicle features an image acquisition device for detecting obstacles and/or persons located within the environment, wherein the vehicle features a screen for displaying information, which with respect to a displaying plane is usually aligned horizontally during the operation of the vehicle, and wherein the vehicle features a computer device that, when the presence of a user is detected, is designed for determining the spatial position of the user relative to the vehicle and for varying a displaying direction of the information displayed on the screen in dependence on the determined spatial position of the user.

The vehicle, particularly a thusly designed cleaning robot, is therefore suitable for carrying out an above-described method and for aligning the information displayed on the screen of the vehicle in such a way that a user can optimally read this information from his current viewing direction and/or optimally operate the vehicle from his current operating direction.

In order to optimally display and align the information on the screen, it is particularly proposed that the screen has a display area, the side lengths of which are at least as long as the longest possible diagonal of the information displayed on the screen, and/or that the screen has a round display area with a diameter, which is at least as large as a diagonal of the information displayed on the screen. According to this embodiment, the ratio between the overall display area of the screen and the partial display area occupied by the displayed information is chosen such that the displayed information also does not protrude beyond the edge of the display area when it is rotated on the screen and the information can therefore be displayed in its entirety regardless of the current displaying direction, particularly without cutting off edge regions.

BRIEF DESCRIPTION OF THE DRAWINGS

The invention is described in greater detail below with reference to exemplary embodiments. In the drawings.

DESCRIPTION OF THE EMBODIMENTS

Figure 1:
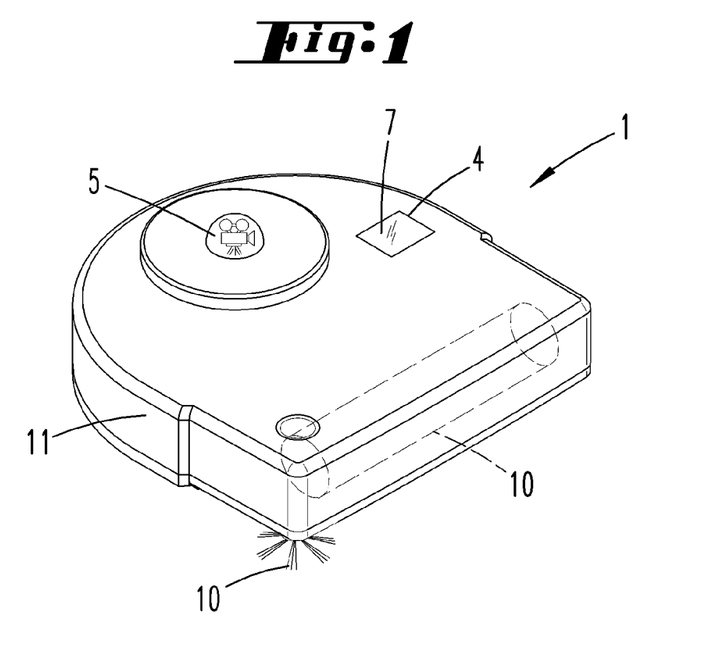
FIG. 1 shows an inventive self-traveling vehicle.

FIG. 1 shows a vehicle 1 that travels by itself within an environment and is realized in the form of a vacuuming robot in this case. The vehicle 1 features a housing 11, on the upper side of which a screen 4 with a display area 7 is arranged. In addition, the vehicle 1 features motor-driven wheels 12 (see FIGS. 2-4) for its progressive motion within the environment, as well as one or more cleaning elements 10 for performing a cleaning activity. The vehicle 1 furthermore features a not-shown triangulation measuring device that can carry out distance measurements within a detection plane over an angular range of 360°, i.e. all around the vehicle 1. For example, the triangulation measuring device comprises a laser for emitting a light beam. The light beam is emitted through an opening in the housing 11 of the vehicle 1 and scans the environment of the vehicle 1 over the angular range of 360°. When the light beam encounters an obstacle, at least a portion is reflected and detected by a sensor of the triangulation measuring device. The reflected portion is incident on a different position of the sensor depending on the distance between the triangulation measuring device and the obstacle reflecting the light beam. The distance of the obstacle from the vehicle 1 can be determined based on this position. In addition to the triangulation measuring device, the vehicle 1 also features a not-shown odometric measuring device that is assigned to the wheels 12 of the vehicle 1 and can measure a distance traveled, as well as a traveling direction. The vehicle 1 is provided with an internal memory, as well as a computer device, by means of which an environment map of the environment of the vehicle 1 can be generated from the measuring data. The vehicle 1 can orient itself within the environment based on this environment map and plan a traveling route, e.g., for purposefully cleaning the floor in a residence. The measured data recorded by the odometric measuring device is compared with the environment data of the triangulation measuring device in order to generate the environment map. The generated environment map can be optionally displayed for a user of the vehicle 1 on the screen 4 of the vehicle 1.

In addition, the vehicle 1 features an image acquisition device 5, namely a camera, which is pivotably arranged in such a way that a detection range of the image acquisition device 5 can be pivoted about the vehicle 1 over an angular range of 360°. The image acquisition device 5 is communicatively linked to the computer device of the vehicle 1 such that the recorded image data can be analyzed by means of the computer device.

Figure 2:
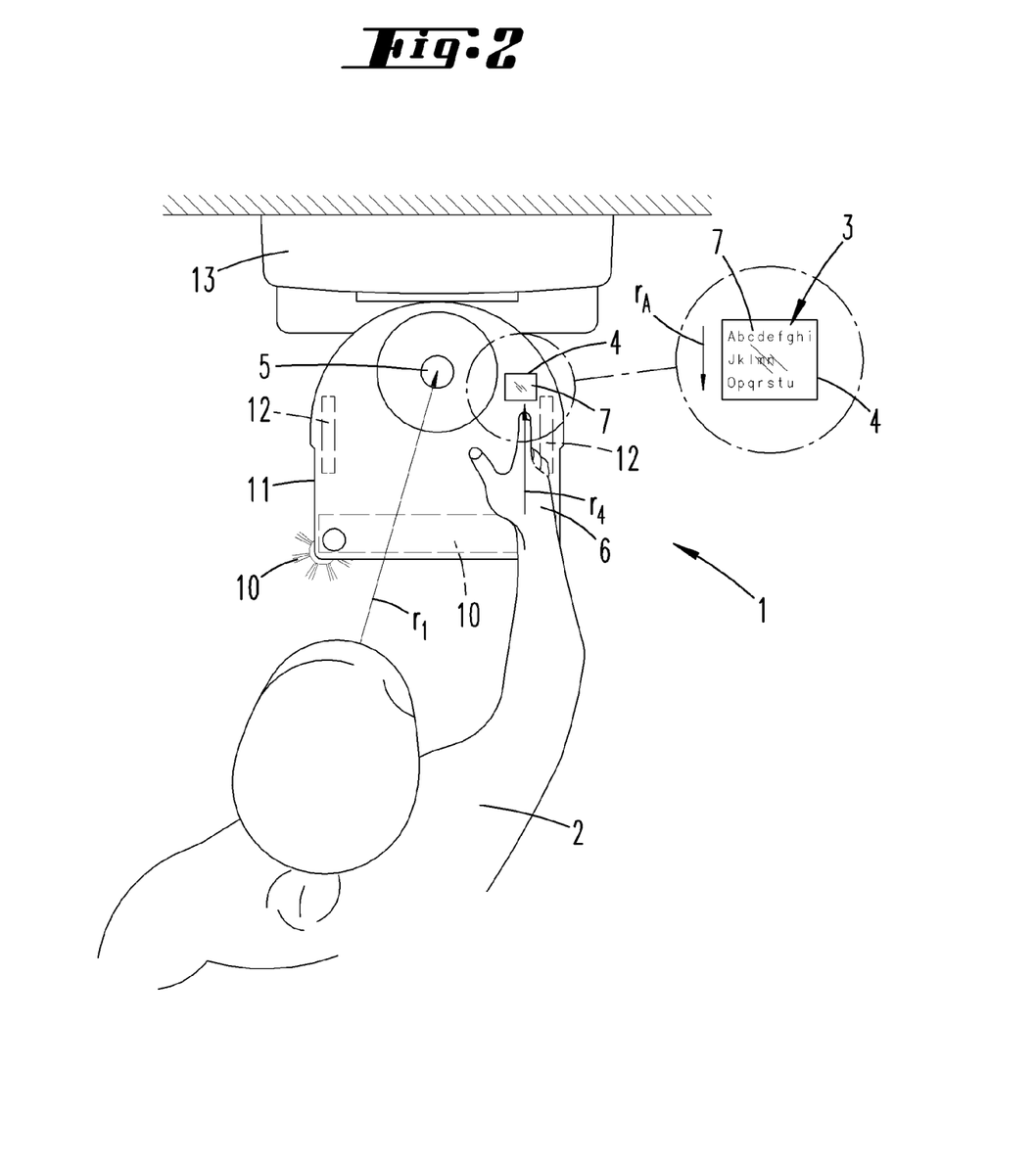
FIG. 2 shows a situation, in which the vehicle is operated by a user from a first direction.

FIG. 2 shows an operating process of a user 2 on the vehicle 1. In this case, the vehicle 1 is connected to a base station 13, e.g., in order to charge a rechargeable battery. In the spatial situation shown, the user 2 is—referred to a normal main traveling direction of the vehicle 1—located in front of the vehicle 1, namely where the leading cleaning elements 10 of the vehicle 1 are arranged. In this case, the cleaning elements 10 consist, e.g., of a cleaning roller that is driven by an electric motor and a lateral brush. The user 2 intends to make a selection from the information 3 displayed on the screen 4. This information 3 may concern, e.g., different adjustable power stages of a motor-blower unit of the vehicle 1. The information 3 is displayed on a display area of the screen 4 in a displaying direction $r_A$. This displaying direction $r_A$ essentially corresponds to a current viewing direction $r_1$ of the user 2 at the vehicle 1. The viewing direction $r_1$ of the user 2 may be oriented at different areas of the vehicle 1, e.g. at the screen 4, at part of the housing 11 of the vehicle 1 or in the direction of the image acquisition device 5. In the exemplary embodiment shown, it is assumed that the user 2 is looking in the direction of the image acquisition device such that the viewing direction $r_1$ extends along a straight line between the eyes of the user 2 and the image acquisition device 5. The user 2 simultaneously moves a hand 6 in the direction of the screen 4 such that an operating direction $r_4$ is defined by the position and orientation of the user's hand 6. In this case, the operating direction $r_4$ corresponds to the orientation of the index finger of the hand 6. Based on the situation illustrated in FIG. 2, in which the displaying direction $r_A$ of the information 3 is essentially aligned parallel to the viewing direction $r_1$ and/or the operating direction $r_4$, the user 2 can also operate the vehicle 1 from a different spatial position and orientation. This situation is illustrated in FIG. 3.

Figure 3:
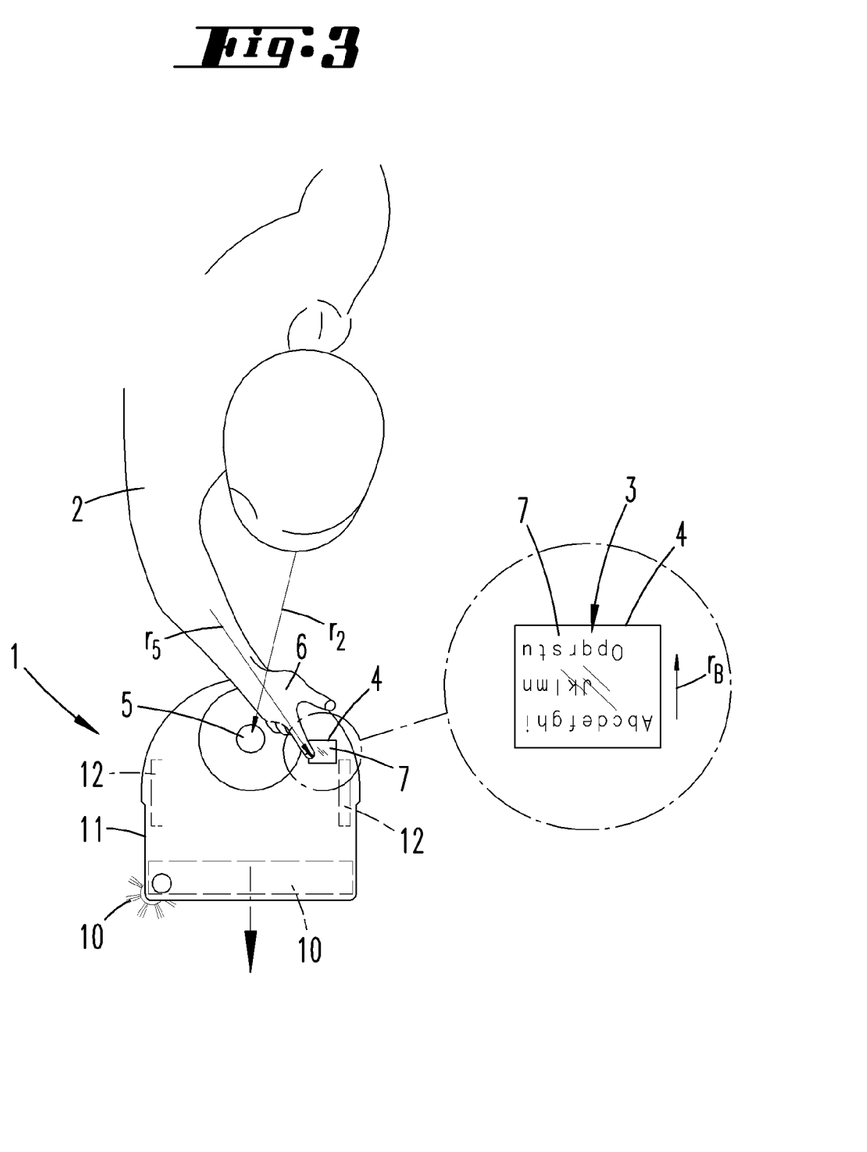
FIG. 3 shows a situation, in which the vehicle is operated by a user from a second direction.

FIG. 3 shows the vehicle 1 and the user 2 in an arrangement, in which the user is located behind the vehicle 1—referred to the main traveling direction of the vehicle 1. In order to also enable the user 2 to optimally read the information 3 on the screen 4 from this spatial position, particularly without having to move relative to the vehicle 1, the following steps are carried out based on the situation illustrated in FIG. 2.

The user 2 initially turns toward the vehicle 1. In the process, the user looks at the vehicle 1, e.g. at the image acquisition device 5 arranged centrally on the vehicle 1, and moves a hand 6 in the direction of the screen 4, on which the user intends to make a selection from the displayed information 3. In this case, the viewing direction $r_2$ and the operating direction $r_5$ are directed at the vehicle 1 from a position of the user 2 behind the vehicle 1. During the operation of the vehicle 1, the image acquisition device 5 records images of the environment of the vehicle 1 in predefined time intervals. The image acquisition device 5 transmits the recorded image data to the computer device of the vehicle 1, in which it is analyzed, in particular, with respect to the presence of a user 2 within the immediate environment of the vehicle 1. In this case, the image processing is realized, for example, by utilizing a face recognition process, which on the one hand recognizes a face depicted in the image as such and on the other hand can associate the face with a registered user 2 of the vehicle 1. For this purpose, the image data is compared with corresponding stored reference data. The face recognition process furthermore analyzes the data to the effect whether the user 2 is currently looking at the vehicle 1 or alternatively in another direction that faces away from the vehicle 1. In this case, the user 2 is looking at the vehicle 1 along the viewing direction $r_2$, which is interpreted as an intent of the user 2 to operate the vehicle. The screen 4 is realized in the form of a capacitive touchscreen and furthermore detects when a hand 6 of the user 2 approaches the screen 4, which is likewise interpreted as an intent of the user 2 to operate the vehicle. The computer device of the vehicle 1 determines the operating direction $r_5$, which in this case corresponds to the orientation of the index finger of the hand 6 of the user 2, based on the capacitance values of the individual sections of the screen 4. Subsequently, the viewing direction $r_2$ and the operating direction $r_5$ are vectorially compared and combined into a vector that corresponds to the arithmetical average of the viewing direction $r_2$ and the operating direction $r_5$. A displaying direction $r_B$ of the screen 4, in which the information 3 displayed on the screen 4 is oriented relative to the housing 11 of the vehicle 1, is then associated with the averaged direction. Based on the situation illustrated in FIG. 2, the information 3 is in the situation according to FIG. 3 rotated by 180° such that the user 2 can conventionally read the information 3 without having to move relative to the vehicle 1.

Figure 4:
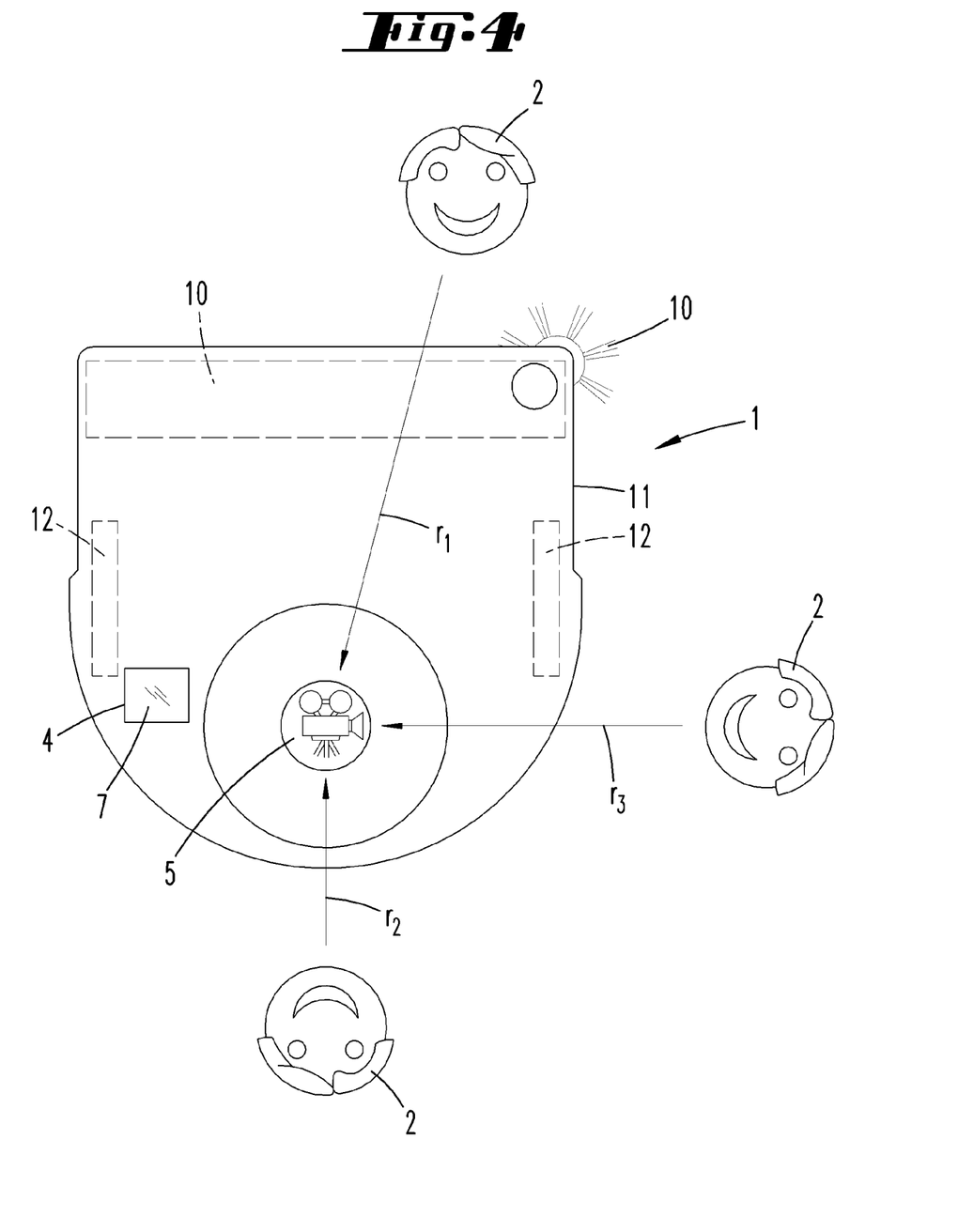
FIG. 4 shows a schematic representation of the vehicle with different spatial positions of one or more users.

FIG. 4 schematically shows a vehicle 1 and different viewing directions $r_1$, $r_2$, $r_3$ of one or more users 2 at the vehicle 1. In this case, a first viewing direction $r_1$ corresponds to the situation illustrated in FIG. 2, in which a user 2 is looking at the vehicle 1 from the front. The viewing direction $r_2$ corresponds to the presence of the user 2 behind the vehicle 1. The viewing direction $r_2$ essentially corresponds to the situation illustrated in FIG. 3. This figure furthermore shows a viewing direction $r_3$, in which the user 2 is looking at the vehicle 1 from a side. In addition to the viewing directions $r_1$, $r_2$, $r_3$ shown, a large number of other viewing directions $r_1$, $r_2$, $r_3$ are furthermore possible. Positions of the user 2 all around the vehicle 1 can be detected by means of a rotatable image acquisition device 5 or an image acquisition device 5 equipped with a lens that has a corresponding angular coverage, e.g. a wide-angle lens or fisheye lens. The screen 4 has four predefined displaying directions $r_A$, $r_B$, $r_C$, in which information 3 can be displayed. These displaying directions $r_A$, $r_B$, $r_C$ are oriented parallel to the sides of the screen 4 such that the display area 7 of the screen 4 can be optimally utilized.

Figure 5:
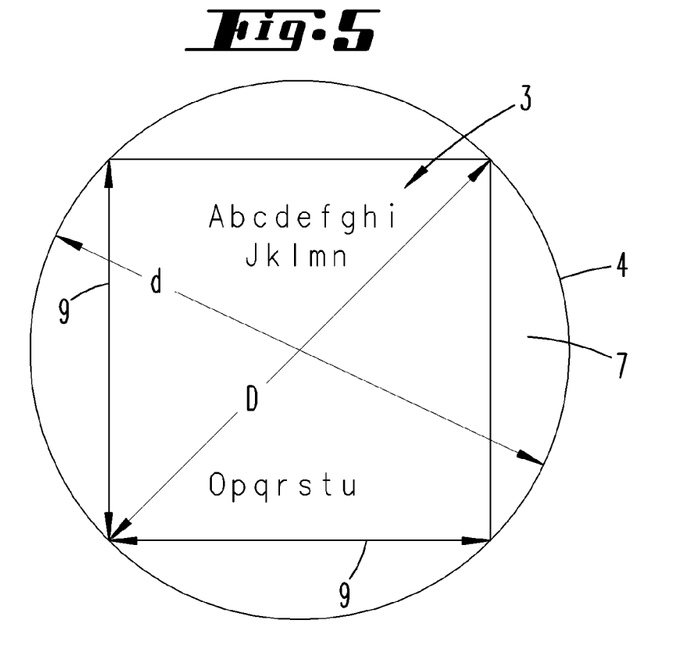
FIG. 5 shows a schematic diagram of a display area of a screen with information displayed thereon according to a first embodiment.
Figure 6:
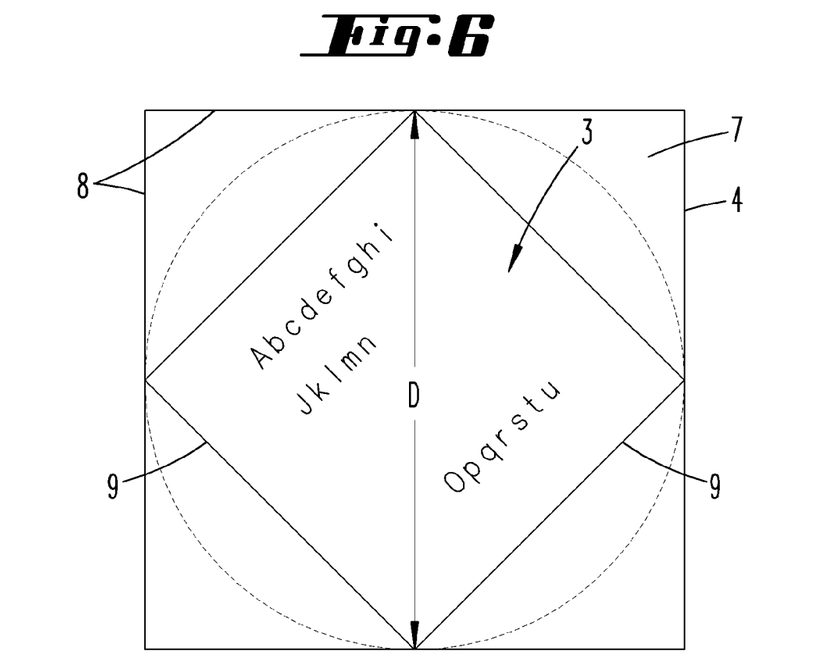
FIG. 6 shows a schematic diagram of a display area of a screen according to a second embodiment.

FIGS. 5 and 6 show two alternative embodiments of a screen 4 of the vehicle 1, on which information 3 can be displayed in arbitrary displaying directions $r_A$, $r_B$, $r_C$ that can be selected in an infinitely variable fashion.

FIG. 5 shows an embodiment of a screen 4 with a round display area 7. The display area 7 is designed for displaying information 3 in each section. The display area 7 has a diameter d that corresponds to the diagonal D of a section, in which information 3 can be displayed. The section containing the information 3 is realized square, wherein the corners of the square extend along the circumferential line of the circular screen 4 during a rotation of the information 3 on the screen 4. The information 3 is always displayed in its entirety on the display area 7 regardless of the current orientation of the information 3 on the screen 4.

FIG. 6 shows a square screen 4 with a display area 7 that can be used for displaying information 3 over its entire longitudinal and lateral extent. A likewise square section in the center of the display area 7 is occupied by displayed information 3 and can be rotated about a center of the display area 7 in dependence on a detected spatial position of a user 2. The display area 7 has side lengths 8 that are exactly as long as a diagonal D of the section of the screen 4 occupied by the information 3. The section occupied by the information 3 has a maximum side length 9. All side lengths 9 are identical because the information 3 also occupies a square area. The corners of the square move along a circular path (illustrated with broken lines) when the orientation of the displayed information 3 is changed. This circular path is inscribed in the display area 7 such that even the outermost corner regions of the displayed information 3 are always located within the display area 7 and no information 3 is cut off when the orientation of the information 3 is changed.

Figure 7A:
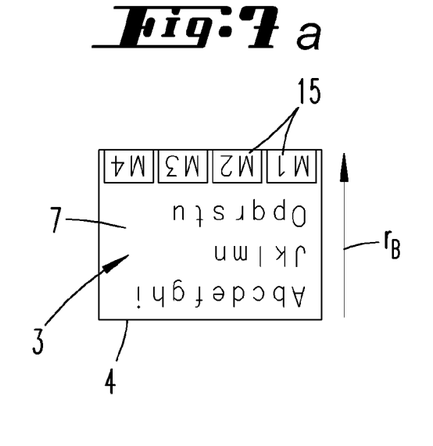
FIGS. 7a, 7b, 7c show a first embodiment of a screen with information displayed in different displaying directions.
Figure 7B:
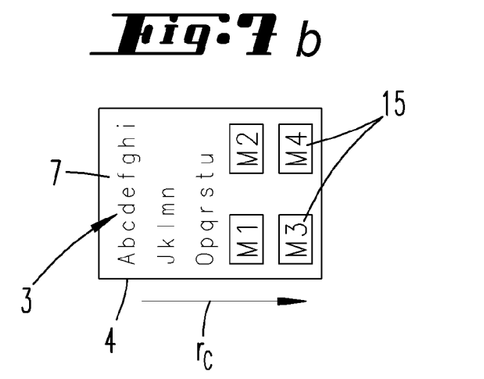
Figure 7C:
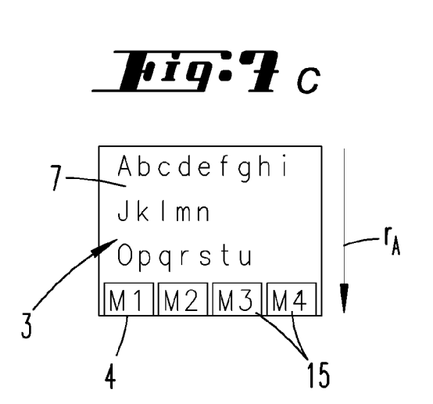
Figure 8A:
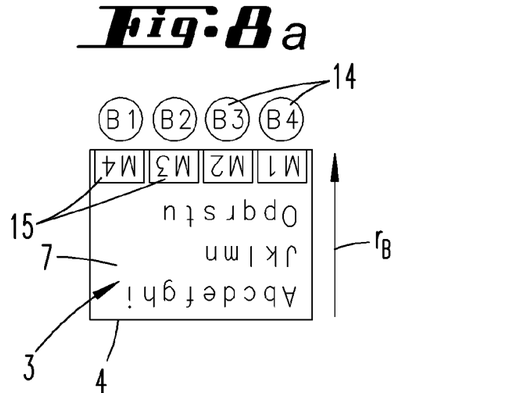
FIGS. 8a, 8b, 8c show a second embodiment of a screen with information displayed in different displaying directions.
Figure 8B:
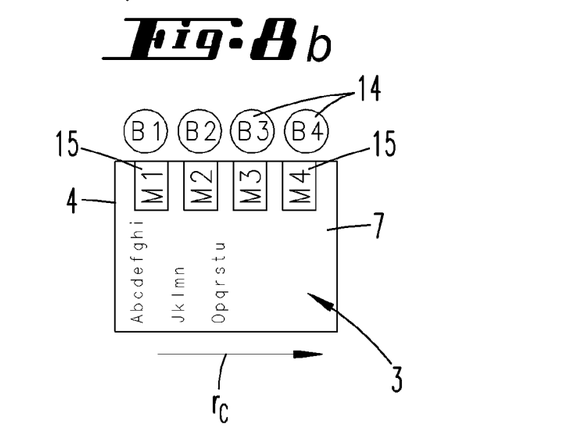
Figure 8C:
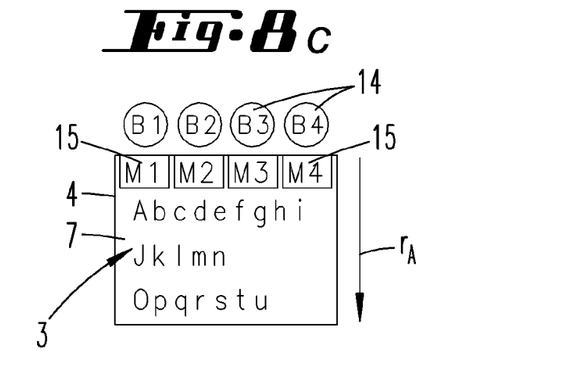

FIGS. 7 and 8 show different embodiments of screens 4, on which the displayed information 3 is arranged differently.

FIGS. 7a, 7b and 7c respectively show a screen 4, on which information 3 in text form on the one hand and operating elements 15 on the other hand are displayed. The operating elements 15 are displayed on the screen 4 in the form of touch-sensitive areas, on which the user 2 can press, for example, in order to make a menu selection. In this case, the operating elements 15 are arranged in an edge region of the display area 7 of the screen 4, namely underneath the displayed text depending on the respective displaying direction $r_A$, $r_B$, $r_C$, such that the user 2 does not cover the additional information 3 displayed on the screen 4 with his hand 6 during the actuation of one of the operating elements 15. FIGS. 7a, 7b and 7c show different displaying directions $r_A$, $r_B$, $r_C$ of the information 3, which correspond to different positions of the user 2 relative to the vehicle 1. The displaying direction $r_B$ of the information 3 illustrated in FIG. 7a corresponds to a situation, in which the user 2 is located on the upper side in the displaying plane of projection shown. FIG. 7b corresponds to a situation, in which the user 2 is located to the right of the screen 4 and FIG. 7c ultimately shows a situation, in which the user 2 is looking at the vehicle from the lower side. In all situations shown, the information 3 is arranged on the screen 4 in such a way that the operating elements 15 point in the direction of the user and therefore are located between the remaining information 3 being displayed, for example textual components, and the user 2.

FIGS. 8a, 8b and 8c show another embodiment of a screen 4, to which separate actuating elements 14 in the form of buttons are assigned outside the display area 7. In this case, the operating elements 15 displayed on the screen 4 form explanations and/or designations for the associated actuating elements 14 such that the user 2 is provided with information on the function of the actuating elements 14. In order to ensure that the operating elements always remain adjacent to the associated actuating elements 14 even if the orientation of the information 3 on the screen 4 changes, the operating elements 15 are always arranged on the upper edge of the screen 4 in the plane of projection shown. However, the orientation of the designation displayed on the operating elements 15 changes such that it corresponds to the orientation of the remaining information 3, namely to the respective displaying directions $r_B$ (FIG. 8a), $r_C$ (FIG. 8b) and $r_A$ (FIG. 8c).

LIST OF REFERENCE SYMBOLS

1 Vehicle
2 User
3 Information
4 Screen
5 Image acquisition device
6 Hand
7 Display area
8 Side length
9 Side length
10 Cleaning element
11 Housing
12 Wheel
13 Base station
14 Actuating element
15 Operating element
$r_A$ Displaying direction
$r_B$ Displaying direction
$r_C$ Displaying direction
$r_1$ Viewing direction
$r_2$ Viewing direction
$r_3$ Viewing direction
$r_4$ Operating direction
$r_5$ Operating direction
d Diameter
D Diagonal

The invention claimed is:

1. A method for operating an unmanned vehicle (1) that travels by itself within an environment, comprising the steps of:
   detecting with the vehicle obstacles and/or persons located within the environment,
   displaying information (3) for a user (2) on a screen (4) of the vehicle (1), the information being aligned horizontally with respect to a displaying plane during the operation of the vehicle (1),
   determining a spatial position of the user (2) relative to the vehicle (1) when the presence of the user is detected and
   varying an orientation of the displayed information (3) in dependence on the determined spatial position of the user (2), wherein the information (3) is rotated by up to +/−180° based on a previous orientation of the information (3) relative to the display, such that the information (3) is readable by a user without having to move relative to the vehicle, and wherein operating elements (15) displayed on the screen (4) are regrouped relative to one another depending on the spatial position of the user (2) relative to the vehicle (1),
   wherein a viewing direction of the user is determined by means of a face recognition process and wherein an operating direction from which the user operates the vehicle is detected, wherein the viewing direction and the operating direction are vectorially compared and combined into a vector that corresponds to the arithmetical average of the viewing direction and the operating direction, and wherein a displaying direction of the screen, in which the information displayed on the screen is oriented relative to the housing of the vehicle, is associated with the averaged direction.

2. The method according to claim 1, wherein the presence of the user (2) is detected by means of an image acquisition device (5).

3. The method according to claim 1, wherein an orientation of a hand (6) of the user (2), which manipulates the vehicle (1), is detected.

4. The method according to claim 3, wherein the orientation of the hand (6) is detected by means of a capacitive sensor, and/or by means of an image acquisition device (5).

5. The method according to claim 1, wherein one of multiple potential displaying directions ($r_A$, $r_B$, $r_C$) of the screen (4) is selected in dependence on the determined spatial position of the user (2).

6. The method according to claim 1, wherein multiple sections of the information (3) displayed on the screen (4) are regrouped relative to one another in dependence on the spatial position of the user (2).

7. The method according to claim 1, comprising the successive steps of:
   recording the environment of the vehicle (1) by means of an image acquisition device (5),
   detecting the presence of the user (2) in the environment of the vehicle (1),
   determining a viewing direction ($r_1$) and/or an operating direction ($r_2$) of a hand (6) of the user (2),
   associating a certain viewing direction ($r_1$) and/or operating direction ($r_2$) with a displaying direction ($r_A$, $r_B$, $r_C$) of the screen (4), and
   displaying the information with the orientation of the associated displaying direction ($r_A$, $r_B$, $r_C$).

8. An unmanned vehicle (1) that travels by itself within an environment, with an image acquisition device (5) for detecting obstacles and/or persons located within the environment, wherein the vehicle (1) features a screen (4) for displaying information (3), which is aligned horizontally relative to a displaying plane during the operation of the vehicle (1), the unmanned vehicle comprising a computer device that, when the presence of a user (2) is detected, is designed for determining the spatial position of the user (2) relative to the vehicle (1) and for varying a displaying direction ($r_A$, $r_B$, $r_C$) of the information (3) displayed on the screen (4) in dependence on the determined spatial position of the user (2), wherein the computer device is designed for rotating the information (3) by up to +/−1800 based on a previous orientation of the information (3) relative to the display such, that the user can conventionally read the information (3) without having to move relative to the vehicle, and wherein operating elements (15) displayed on the screen (4) are regrouped relative to one another in dependence on the spatial position of the user (2) relative to the vehicle (1) wherein the computer device is configured for determining a viewing direction of the user by means of a face recognition process and detecting an operating direction from which the user operates the vehicle, vectorially comparing the viewing direction and the operating direction and combing the viewing direction and operating direction into a vector that corresponds to the arithmetical average of the viewing direction and the operating direction, and wherein the computer device is configured for associating a displaying direction of the screen, in which the information displayed on the screen is oriented relative to the housing of the vehicle, with the averaged direction.

9. The vehicle according to claim 8, wherein the screen (4) has a display area (7), the side lengths (8) of which are at least as long as the longest possible diagonal (D) of the information (3) displayed on the screen (4), and/or that the screen (4) has a round display area (7) with a diameter (d), which is at least as large as a diagonal (D) of the information (3) displayed on the screen (4).

* * * * *